United States Patent [19]

Chabot et al.

[11] 4,060,117
[45] Nov. 29, 1977

[54] INERTIAL RING LOCK

[75] Inventors: Daniel H. Chabot, Los Alamos; Robert S. Peterson; Roy D. Plumer, both of Santa Barbara, all of Calif.

[73] Assignee: General Motors Corporation, Detroit, Mich.

[21] Appl. No.: 676,354

[22] Filed: Apr. 12, 1976

[51] Int. Cl.$^2$ .................. F16B 39/00; F16B 21/00
[52] U.S. Cl. ............................................. 151/43; 85/8.8; 285/81; 403/320; 403/326
[58] Field of Search .................. 85/8.8, 150 B, 51; 151/7, 43, 70; 285/81, 89, 92; 403/320, 326

[56] References Cited
U.S. PATENT DOCUMENTS

| 938,320 | 10/1909 | Hand | 151/43 X |
|---|---|---|---|
| 985,269 | 2/1911 | McIntyre et al. | 151/43 |
| 1,140,036 | 5/1915 | Hella | 151/43 X |
| 1,572,770 | 2/1926 | Colley | 85/8.8 X |
| 1,587,064 | 6/1926 | Bryson | 151/43 X |
| 1,925,937 | 9/1933 | Schultis | 285/89 |
| 3,080,771 | 3/1963 | Baldwin | 85/8.8 X |
| 3,138,188 | 6/1964 | Tuozzo et al. | 85/8.8 X |
| 3,221,794 | 12/1965 | Acres | 85/8.8 X |
| 3,366,356 | 1/1968 | Fisher | 85/8.8 X |
| 3,503,431 | 3/1970 | Villo et al. | 85/8.8 |

FOREIGN PATENT DOCUMENTS

| 139,519 | 12/1948 | Australia | 151/7 |
|---|---|---|---|
| 1,393,257 | 5/1975 | United Kingdom | 151/7 |

Primary Examiner—Roy D. Frazier
Assistant Examiner—Thomas J. Holko
Attorney, Agent, or Firm—Arthur N. Krein

[57] ABSTRACT

An inertial ring lock, in the form of a semi-circular ring washer, is used as a retainer for a threaded fastener in threaded engagement with a threaded aperture in a support element, the ring lock being snapped into a relief groove in the threaded fastener to loosely encircle the threaded fastener in position to loosely engage the support element when the threaded fastener is fully threaded therein.

4 Claims, 4 Drawing Figures

INERTIAL RING LOCK

The invention herein described was made in the course of work under a contract or subcontract thereunder with the Department of Defense.

This invention relates to threaded fastener retainers and, in particular, to an inertial ring lock for a threaded fastener.

Various devices are known for use as a locking device for a threaded fastener, such as bolts, screws and nuts to prevent turning and loosening, under vibrational loads, relative to the element with which it is threadably secured. One such form of locking device is that class of washers identified as lock washers, which class includes the split-ring type spring washers. When using such lock washers as, for example, with a nut threaded onto a bolt, it is necessary to torque the nut down sufficiently so that the locking elements of the lock washer will bite into either the bearing surface of the nut or the bearing work surface, through which the bolt extends, or into both such surfaces. However, these prior art locking devices, such as lock washers including the split-ring type spring washers, are not effective or practical in an application wherein the threaded fastener, such as a screw or nut is torqued down only finger tight, that is, it is torqued down using only the operator's fingers and not a tool, such as a wrench, in a conventional manner.

It is therefore a primary object of this invention to provide a locking device for a threaded fastener that is operable to prevent turning and loosening of the threaded fastener under vibrational loads even when the threaded fastener is secured in finger tight engagement with a threaded workpiece.

Another object of this invention is to provide an inertial ring lock adapted to function as a locking device for a threaded fastener.

These and other objects of this invention are obtained by means of a split-annular ring that is snapped into an annular groove in an externally threaded fastener, adjacent to the head thereof, the fastener being threaded into an internally threaded support member in finger tight relation relative thereto.

For a better understanding of the invention, as well as other objects and further features thereof, reference is had to the following detailed description of the invention to be read in connection with the accompanying drawings, wherein.

Figure 1:
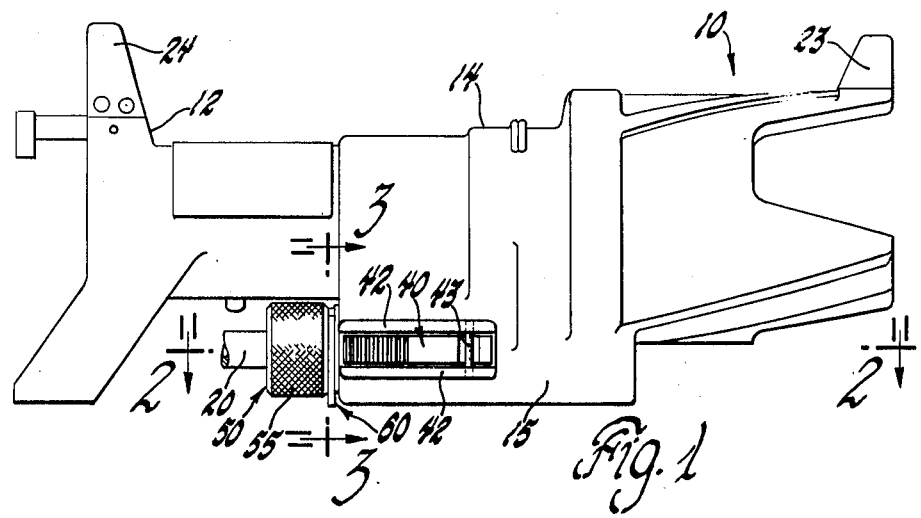
FIG. 1 is a side view of a sting launcher releasably secured to the end of a rifle by means of a retainer nut with an inertial ring lock, in accordance with the invention, associated therewith.

Referring now to FIG. 1, there is shown, for purpose of illustration only, a specific assembly in which the subject inertial ring lock of the invention has been successfully used, this assembly shown being that of a sting launcher mounted over the muzzle of a rifle, such as a military M-16 rifle.

The sting launcher assembly, generally designated 10 in the construction illustrated, is provided with a two-piece body that includes a tubular buffer housing 12 and a barrel housing having a tubular barrel 14 portion, suitably secured coaxial with the buffer housing 12, and an integral adapter body 15 portion that extends below the tubular body portion of buffer housing 12. The adapter body 15 is provided with a stepped bore, extending from its free end, to receive a deflector plug 17 at its inboard end and the muzzle end of the barrel 20 of an M-16 rifle, including the flash-hider 21 thereon, only a portion of the barrel of the rifle being shown. For a well known purpose, an open front site 23 and an open rear site 24 are provided on the barrel 14 and buffer housing 12, respectively.

The above described body of the sting launcher assembly supports the remaining elements of the launcher assembly, these elements not being shown or described since they are not deemed necessary to an understanding of the invention. However, in order to provide some background information as to the type of environment in which the inertial ring lock of the invention operates, it should be realized that the sting launcher assembly, as fixed to the muzzle of an M-16 rifle, is used to launch a sting missile or projectile. Thus, as is well known, there has recently been developed a ring air foil projectile, made for example of plastic material, for use in an anti-riot weapon. This ring air foil projectile is a kinetic energy device used to impart a stinging blow which is non-lethal and, accordingly, it has been given the designation of "stings". Such a non-lethal sting missile, not shown, loaded into the barrel 14 portion of the sting launcher assembly will be discharged therefrom upon the firing of a suitable grenade-type blank cartridge in the M-16 rifle, with gas expelled by this cartridge, upon its being fired, being suitably ported into the body of the sting launcher assembly to provide the necessary amount of force required to effect discharge of the sting missile toward a target at a predetermined velocity and over a total predetermined range from the muzzle of the rifle.

Figure 2:
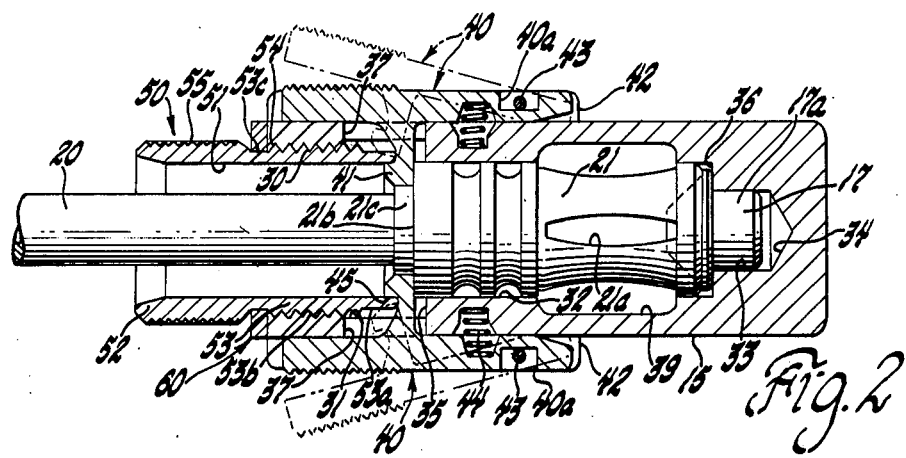
FIG. 2 is a sectional view taken along line 2—2 of FIG. 1 showing the mounting adapter position of the launcher assembly which is adapted to receive the end of a rifle to effect attachment of the launcher assembly to the rifle.

Referring now to FIG. 2, the stepped bore in the adapter body 15 provides in succession, starting from the free end, an internal circular wall of a predetermined inner peripheral diameter greater than the outside diameter of the flash-hider 21, this wall being provided with internal threads 30, an internal annular relief wall 31 of a diameter greater than the major diameter of the threads 30, an internal annular wall 32 of a diameter substantially less than the minor diameter of the threads 30 and sized so as to slidably receive the flash-hider 21 therein, and an internal annular wall 33 that terminates at a radial closed wall 34 closer adjacent to the opposite end of the adapter body, the diameter of the circular wall 33 being sized so as to slidably receive the cylindrical base 17a of deflector 17. The walls 31 and 32 are interconnected by an annular radial shoulder 35 while the walls 32 and 33 are interconnected by an annular radial shoulder 36, this latter shoulder 36 serving as a stop against which the enlarged deflector head of the deflector 17 abuts. the annular wall 33 encircling the flash-hider 21 is intersected by an enlarged passage 39 depending from the barrel 14 so as to intersect the annular wall 33 at a position corresponding to the axial position of the flame quench ports 21a of the flash-hider 21 when the latter is fully inserted into and locked in the adapter body 15, its position shown in FIG. 2.

Figure 3:
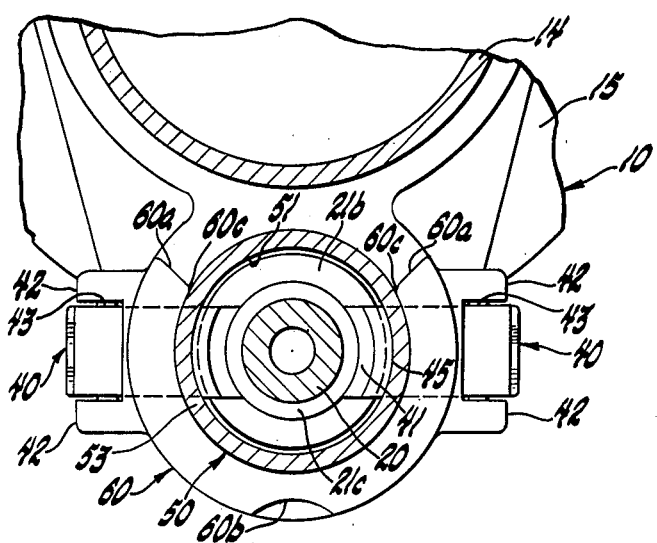
FIG. 3 is a sectional view taken along line 3—3 of FIG. 1.
Figure 4:
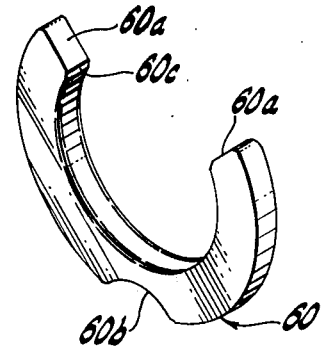
FIG. 4 is a perspective view of the inertial ring lock, per se, of the invention.

To effect rigid attachment of the sting launcher assembly to the barrel of an M-16 rifle, the adapter body is provided with a pair of through slots 37 diametrically opposite and extending from the outer peripheral surface of the adapter body axially outboard of the radial shoulder 35 to intersect the inner annular wall 31, each of these slots 37 being provided so as to loosely receive the lock tang 41 of a latch 40, two such latches 40 being used on diametrically opposite sides of the adapter body. To pivotably support the latches 40, the adapter body 15 is provided on opposite sides thereof with oppositely extending pairs of spaced apart radially outward extending lugs 42 whereby to pivotally receive therebetween one end of a latch, each latch being pivotally secured by means of a pivot pin 43 extending between a set of the spaced apart lugs, as best seen in FIGS. 2 and 3. As shown, the intermediate portion of each pivot pin 43 extends into an open slot 40a in one side of a latch 40l, the side opposite a lock tang 41, and closely adjacent to the one end of the latch whereby the latch is free to pivot about the outer peripheral surface of the pivot pin 43 and it is free for limited longitudinal movement in a direction substantially parallel to the axis of the stepped bore in the adapter housing 15.

As pivotally mounted to the adapter body, each latch includes a lock tang 41 extending at right angle relative to the main body portion of the latch 40 in position for movement through a slot 37 in the adapter body 15 from a first position or unlock position in which the lock tang 41 is out of engagement with the inboard radial shoulder 21b on the flash-hider, the position shown in broken line in FIG. 2, to a second position or lock position at which the front face of the lock tang 41 abuts against this radial shoulder of the flash-hider whereby the flash-hider 21 is then captured between these lock tangs 41 on the retainer latches 40 and a stop, as provided by the deflector 17 in the adapter body, this latter position of the retainers being shown in solid line in FIG. 2. Each latch 40 is normally biased to the first position by means of a spring 44 loated intermediate the pivot axis of its associated pivot pin 43 and its lock tang 41, as by having the spring 44 positioned in suitable cavities provided for this purpose in both the adapter body 15 and the main body portion of a latch 40 whereby one end of the spring 44 will abut against the bottom wall of the cavity in the adapter body and the other end of the spring will abut against the latch 40 to normally bias the latch for pivotal movement in a direction to effect its movement from a lock position to an unlock position. Also, as best seen in FIGS. 2 and 3, the free end of each lock tang 41 is of accurate configuration and the lengths of the lock tangs 41 on the latches 40 are such that when the latches are in the lock position, the free ends of the lock tangs 41 loosely encircle parts of the rear hub 21c of the flash-hider 21.

In addition, the rear facing of each lock tang is undercut inboard the free end thereof to provide a semi-circular flange 45 whereby when the two latches 40 are in their lock position, the semi-circular flanges 45 on their lock tangs 41 will present a pair of opposite spaced apart flanges having an effective predetermined outside diameter, for a purpose to become apparent.

To releasably retain the latches in their lock position, there is provided an externally threaded fastener, hereinafter referred to as a retainer or attachment nut 50, that is threaded into the adapter housing 15 to abut against the lock tangs of the latches 40 and, in accordance with the invention, a locking device, in the form of an inertial ring lock 60, is loosely engaged in a suitable annular groove, provided for this purpose in the attachment nut 50, to prevent turning and loosening of the attachment nut 50 under vibrational loads.

The attachment nut 50, of tubular configuration, has a bore therethrough to provide an inner peripheral wall 51 having a predetermined inside diameter of a size whereby to freely allow the passage of the rifle barrel 20 and its associated flash-hider 21 therethrough and, whereby the shank end of this attachment nut can encircle the semi-circular flanges 43 of the latches 40 so as to releasably retain these latches in their lock positions. The attachment nut 50 includes an enlarged annular head 52 and an annular shank 53 integral with and extending from the head. This shank 53 has a free end 53a of a reduced diameter that is less than the minor diameter of the internal thread 30 of adapter housing 15, an intermediate portion provided with external threads 53b formed complementary to the internal threads 30 of the adapter housing 15 for threaded engagement therewith and, an undercut, annular, thread run-out groove 53c next adjacent to the head 52 to receive the ring lock 60. The groove 53c in the construction illustrated has its side 54 facing the head 52 inclined at an acute angle relative to the axis of the attachment nut, this side 54 interconnecting the bottom surface of the annular groove 53c and the threads 53b.

The outer peripheral surface of the head 52 of the attachment nut may be provided with a suitable wrenching surface and since, in the construction shown, the attachment nut is intended to be finger manipulated only, this wrenching surface is in the form of a knurled surface 55 whereby to provide a suitable gripping surface for finger tightening only of the attachment nut. Thus in the field, the rifleman can readily effect attachment or removal of the sting launcher assembly 10 from his rifle without the need of any special tool.

The inertial ring lock 60 of the invention is formed so as to provide a ring type mass that is hung on the attachment nut 50 in a suitable manner, such as in its thread relief groove or, as illustrated, in a groove 53c provided for this purpose on the attachment nut. For ease in securing such a ring type mass onto the attachment nut, the inertial ring lock 60 is preferably formed so as to be similar in construction to a split ring type external snap ring or circlet. Thus as shown, the inertial ring lock 60 is in the form of a semi-circular apertured disk of predetermined internal and external diameters and having opposed free ends 60a separated by a suitable gap whereby to permit this lock ring to be snapped into the groove 53c so that the ring lock 60 can loosely, partly encircle the attachment nut 50. In addition, in the construction shown, the inertial ring lock 60 is provided intermediate its free ends 60a, and thus opposite the gap between these free ends, with a radially inward extending, curved notch 60b. In addition, the inner peripheral surface of the ring lock where this surface joins the opposed sides of the ring lock is chamfered on each side edge as at 60c.

It will be apparent from the structure shown in FIG. 2 that the inertial ring lock 60 is free to rotate in the groove 53c and that it simply rides in this groove, apparently causing the attachment nut to remain tight by some type of friction coupling, which cannot be fully explained at this time, or it may function with the attachment nut as a torsional or inertia damper. Thus, it may appear that the mode of locking is through drag of the inside corners of the free ends 60a of the inertial ring lock and that this drag and the inertial action of the ring lock 60 during the moment of firing of the rifle is enough to maintain and/or give impetus to the nut to prevent if from loosening or, to cause it to tighten slightly. However, this tightening is such that the attachment nut 50 still can be removed by finger manipulation of the attachment nut. It will also be apparent that since the inertial ring lock freely circulates in the groove 53c, it allows for easy finger tightening or loosening of the attachment nut 50. However, it should be noted that the inertial ring lock 60 definitely does not act as a lock washer since there is no interference fit getween it and the elements with which it is associated and it is free to rotate in the groove 53c of the attachment nut 50.

Although the subject inertial ring lock is shown as used on military type weapon, it will be apparent that this inertial ring lock of the invention can be used on other type devices where torsional and vibrational loads are introduced into threaded fasteners which must remain finger tight during repeated cycles of operation of such device.

What is claimed is:

1. In combination, a threaded fastener having a head and a shank extending therefrom, said shank adjacent its free end having external threads and having an annular relief groove next adjacent said head, a body means having a threaded bore extending from one end surface thereof receiving said external threads of said threaded fastener in threaded engagement therewith and, a ring like mass loosely encircling said threaded fastener in said relief groove, said ring like mass being loosely sandwiched between said head and said one end surface of said body means when said threaded fastener is fully operatively threaded into said body means whereby said ring like mass is operative to serve as an inertia damper to prevent rotation of said threaded fastener in a loosening direction relative to said body means when said body means is subjected to vibrational and torsional loads.

2. In combination, a threaded fastener having a head and shank extending therefrom, said shank adjacent its free end having external threads and having an annular relief groove next adjacent said head, a body means having a threaded bore extending from one end surface thereof receiving said external threads of said threaded fastener in threaded engagement therewith and, a split ring mass loosely engaged into said relief groove and partly encircling said threaded fastener whereby to serve as an inertia damper to prevent rotation of said threaded fastener in a thread loosening direction when said body means is subjected to vibrational and torsional loads, said split ring mass being loosely sandwiched between said one end surface and said head when said threaded fastener is fully operatively threaded into said body means.

3. In combination, a body means having a bore extending inward from a surface thereof with internal threads on at least a portion of the inner peripheral surface of said body means as provided by said bore, a retainer means having a head with a shank extending therefrom, at least a portion of said shank having external threads thereon in threaded engagement with said internal threads, said retainer means having an annular thread run-out groove on said shank between said external threads and said head next adjacent said head, and a ring mass means positioned in said thread run-out groove loosely encircling said shank and loosely sandwiched between said surface and said head when said retainer means is fully secured to said body means in threaded engagement therewith.

4. In combination, a hollow tubular fastener having a head with a shank extending therefrom, said shank adjacent to its free end having a threaded cylindrical surface, said shank further having an annular relief groove therein next adjacent said head, a body means having a cylindrical bore extending from one end surface thereof with said bore having internal threads extending a predetermined axial distance from said one end surface receiving said external threads of said fastener, said body means further including flange means extending radially inward into a said bore a predetermined axial distance from said one end surface for engagement by the free end of said shank of said fastener which is opposite said head, and, and split ring like mass positioned in said relief groove to loosely, partly encircle said fastener, said split ring like mass being loosely sandwiched between said head and said one end surface of said body means when said free end of said shank is in abutment against said flange means, said split ring like mass being operative to serve as an inertia damper to prevent rotation of said fastener in a loosening direction relative to said body means when said body means is subject to vibrational and torsional loads.

* * * * *

UNITED STATES PATENT AND TRADEMARK OFFICE
CERTIFICATE OF CORRECTION

PATENT NO. : 4,060,117
DATED : November 29, 1977
INVENTOR(S) : Daniel H. Chabot, Robert S. Peterson, Roy D. Plumer It is certified that error appears in the above-identified patent and that said Letters Patent are hereby corrected as shown below:

Column 1, line 53, "position" should read -- portion --.

Column 2, line 51, "closer" should read -- closely --.

Column 3, line 16, "401" should read -- 40 --.

Column 3, line 37, "loated" should read -- located --.

Column 5, line 11, "getween" should read -- between --.

Column 6, line 33, "into a said bore" should read -- into said bore --.

Column 6, line 36, "and, and split ring" should read -- and, a split ring --.

Signed and Sealed this

Ninth Day of May 1978

[SEAL]

Attest:

RUTH C. MASON
Attesting Officer

LUTRELLE F. PARKER
Acting Commissioner of Patents and Trademarks